United States Patent Office 3,473,099
Patented Oct. 14, 1969

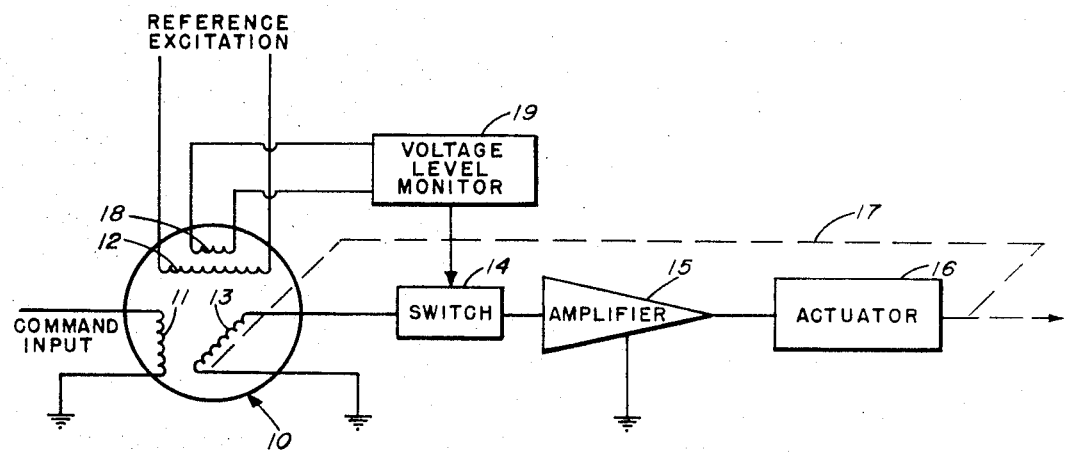

3,473,099
FAIL PASSIVE SERVO
Fred L. Miller, Phoenix, Ariz., assignor, by mesne assignments, to the United States of America as represented by the Secretary of the Navy
Filed Dec. 28, 1966, Ser. No. 605,515
Int. Cl. G05b 5/00
U.S. Cl. 318—18        1 Claim

ABSTRACT OF THE DISCLOSURE

A fail passive servo system having a mechanical coupling between the output actuator and the rotor for summing the input command and excitation signals, as well as a control circuit to disengage the output of the position transducer upon failure of the excitation signal.

---

The present invention relates to a fail passive servo and, more particularly, to a device for controlling an actuator with control means for enabling the system to revert to a neutral position upon the failure of any component in the control system.

In the field of servo control systems, it has been the general practice to employ closed loop feed back techniques to obtain feed back control. Although such techniques have served the purpose, they have not proved entirely satisfactory under all conditions of service. The primary deficiency is that the loss of feed back in the electrical feed back path results in a high gain open loop servo which fails hard over when a command input is applied. A hard over failure entails the movement of the actuator associated with the servo to one of its extreme positions. The possibility of hard over failures in conventional servo systems necessitates complex and accurate monitoring systems which detect a failure and shut off the actuator before it can cause a significant transient effect. If the servo system is designed to control a wing actuator, a failure which is not checked soon enough may endanger flight safety severely. In the case of a dual servo system, a hard over failure of one of the servos impedes the normal operation of the other servo.

The general purpose of the present invention is to provide a fail passive servo which embraces all the advantages of similarly employed fail passive servos and possesses none of the aforedescribed disadvantages. To attain this, the present invention contemplates the use of a unique feed back system wherein the input command and the feed back are summed within a position transducer of the servo system to eliminate any possible open loop conditions characteristic of closed loop electrical feed back systems. In order to further avoid the possibility of a hard over failure, the present invention provides a unique control circuit which disengages the output of the position transducer of the system upon failure of the reference excitation circuit of the position transducer. According to the present invention, an induction resolver is used as the position transducer. A constant excitation is applied to one of the stator windings of the resolver to establish a reference voltage and a servo command signal is applied to the other stator winding. The voltage induced in the rotor winding by the composite excitation from the reference winding and command winding is actually the servo error signal. This signal is passed to a linear actuator. The mechanical output of the actuator is fed to a utilization device, not shown, such as the ailerons of an aircraft. The output of the actuator is also mechanically linked to the rotor of the induction resolver to eliminate any possible open loop conditions which are characteristic of conventional feed back systems. Furthermore, the system provides a tertiary winding which is in close proximity to the reference excitation winding and is capable of detecting reference excitation flux. If this flux disappears, a detector circuit associated with the reference excitation winding opens the output of a rotor circuit thereby eliminating any input signal to the actuator.

Accordingly, an object of the present invention is to provide means to control a linear actuator.

Another object of the present invention is to provide means to sum feed back and input commands in a servo system which is not susceptible to the open loop condition characteristic of conventional servo systems.

Still another object of the present invention is to provide means to disengage the output of an induction resolver of a servo system upon the improper operation of the reference excitation winding of the resolver.

Other objects, advantages and novel features of the present invention will become apparent from the following detailed description of the invention when considered in conjunction with the accompanying drawings wherein:

The figure represents an illustrative embodiment of the present invention.

Referring now to the drawing, the servo includes an induction resolver 10 which has an internal construction which resembles a two-phase, two-pole wound rotor induction motor. The resolver has a pair of stator windings 11 and 12 which are at right angles to each other in space quadrature. The resolver acts like a rotary transformer in which the primary consists of stator windings 11 and 12 and the secondary consists of a rotor winding 13. The command input signal is applied to stator winding 11 and a reference excitation voltage to stator winding 12. The output of the induction resolver is passed through the contacts of a switch 14 and through an amplifier 15 to an actuator 16. The actuator may be any two-phase A.C. motor or single stage jet-pipe valve and a simple ram. The output of actuator 16 is a mechanical force which is passed to the device sought to be controlled by the servo system. The output of actuator 16 is also mechanically linked by mechanical linkage 17 to the rotor winding 13 of induction resolver 10. Induction resolver 10 further contains a tertiary winding 18 which is arranged in close proximity to reference excitation winding 12. Winding 18 is coupled to voltage level monitor 19. The output of voltage level monitor 19 controls switch 14.

In the operation of the circuit, switch 14 is normally in the closed position. A constant excitation voltage is applied to reference excitation winding 12 to establish a reference flux. A command input voltage is applied to command input winding 11. The vector sum of the flux generated induces a voltage in the rotor winding 13 proportional to the sine of the angle between the direction of the vector sum of the flux generated by windings 11 and 12 and the center line of rotor winding 13. The output voltage of rotor winding 13 is passed through the contacts of switch 14, amplified by amplifier 15, and fed to actuator 16. The mechanical output of actuator 16 is fed to the utilization device. Furthermore, the output of actuator 16 is mechanically linked through linkage 17 to the rotor 13 of resolver 10. Rotor 13 is rotated until it is at right angles to the vector sum of the fluxes generated by coils 11 and 12 which is the desired null position. Thus, it is seen that command input 11 can control the position of actuator 16 through the induction of a voltage in rotor coil 13 of resolver 10.

If the command input winding 11 opens or shorts, rotor 13 is rotated to its neutral position which is at right angles in space quadrature to reference excitation coil 12. Winding 18 is in close proximity with excitation winding 12 and detects the presence of flux in winding 12. If this flux should disappear, voltage level monitor 19 is operative to open switch 14 to disengage the output of rotor 13 from amplifier 15 and actuator 16.

Thus, it is seen that if the command input coil opens or shorts, the system reverts to its neutral position. If the reference excitation circuit opens or shorts, the complete system is disengaged. In addition, the mechanical linkage between the actuator and the rotor obviates the possibility of the open loop condition inherent in conventional closed loop feedback systems.

Obviously many modifications and variations of the present invention are possible in the light of the above teachings. It is therefore to be understood that within the scope of the appended claim the invention may be practiced otherwise than as specifically described.

What is claimed is:
1. A fail passive servo comprising:
    an induction resolver having two stator windings normal to each other and a rotor winding;
    a command input circuit coupled to one of said stator windings;
    a reference excitation circuit coupled to the other of said stator windings;
    a normally closed switch coupled to the rotor winding;
    an amplifier connected to the output of the switch;
    an actuator coupled to the output of the amplifier;
    mechanical feedback means coupled between the output of the actuator and the rotor;
    a monitoring coil arranged in close proximity to the reference excitation winding to detect flux in said reference winding;
    a voltage level monitoring circuit having an input and an output wherein the input is coupled to the monitoring coil; and
    means connecting the output of the voltage level monitoring circuit with the normally closed switch, whereby signals from the voltage level monitor activates the switch to decouple the rotor winding from the amplifier should flux from the excitation winding disappear.

References Cited

UNITED STATES PATENTS 3,094,691 6/1963 Treffeisen.
3,109,129 10/1963 Putzer et al.
3,151,282 9/1964 Fisher.

ORIS L. RADER, Primary Examiner

T. E. LYNCH, Assistant Examiner

U.S. Cl. X.R.

318—28, 30